Patented Dec. 6, 1949

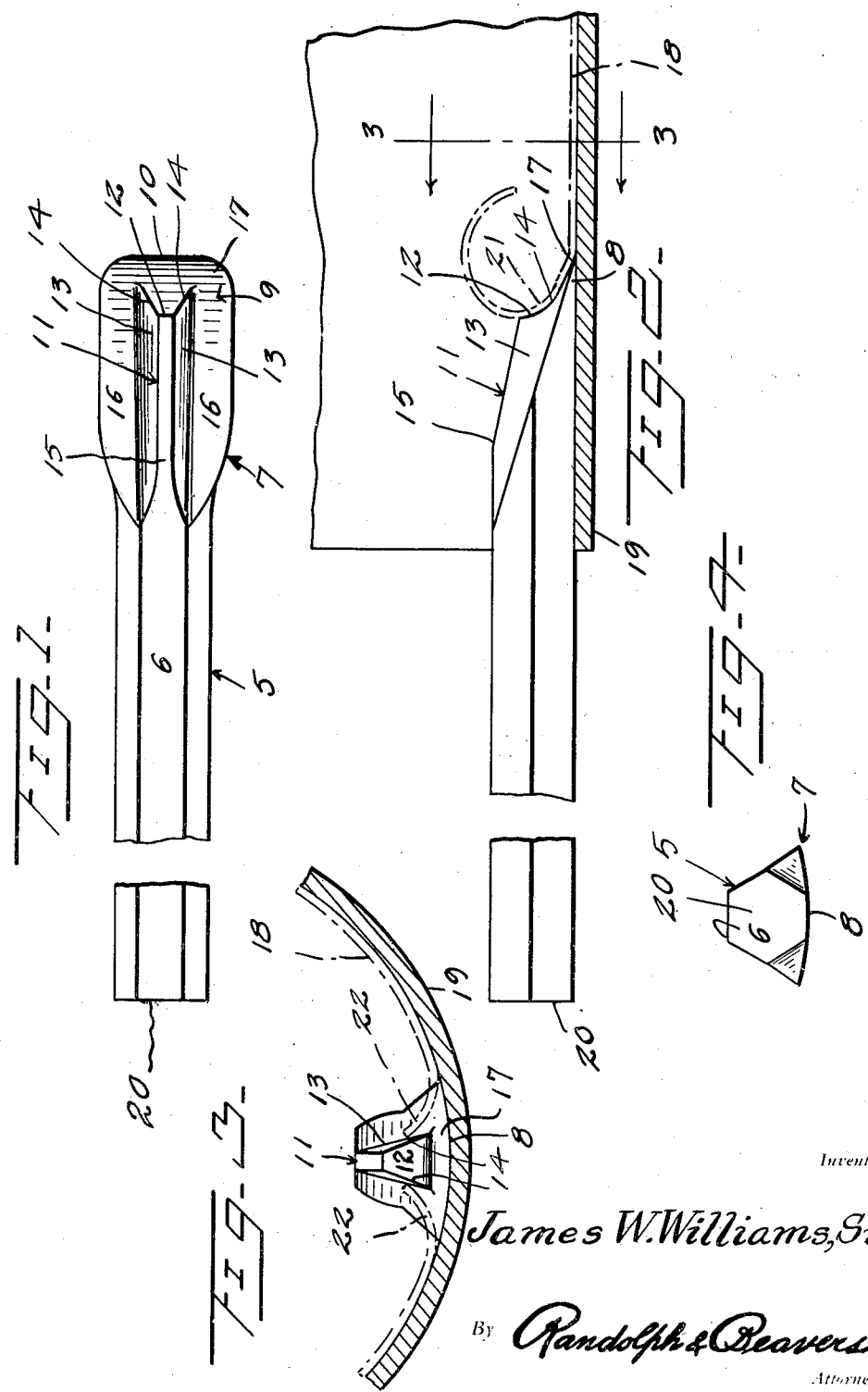

2,490,565

UNITED STATES PATENT OFFICE 2,490,565

BUSHING, SLEEVE, AND LINER REMOVING CHISEL

James W. Williams, New Brunswick, N. J.

Application April 12, 1946, Serial No. 661,710

2 Claims. (Cl. 30—91)

This invention relates to a novel construction of chisel for use in removing bushings, sleeves and liners from the interiors of cylinders, bores or the like, and has for its primary object to provide a tool which will slice a ribbon lengthwise through a liner to thereby reduce the circumference thereof to permit the ready removal of the liner from the cylinder or bore in which it is disposed.

More particularly, it is an object of the invention to provide a chisel for removing liners, bushings and sleeves having guide and retaining means for maintaining the cutting portion of the chisel in correct position to the work to be engaged thereby.

Still another object of the invention is to provide a chisel which will effectively maintain itself in correct position for engagement with the work, which is capable of being readily removed therefrom.

Another object of the invention is to provide a chisel which, after engagement with the work, does not have to be held and may be advanced in its cutting operation by any well known impact means.

Still a further object of the invention is to provide a chisel which will not mar the bore of the cylinder or other piece from which a liner, bushing or sleeve is being removed.

Other objects and advantages of the invention will hereinafter become more fully apparent from the following description of the drawing, which illustrates a preferred embodiment thereof, and wherein:

Fig. 1 is a top plan view of the chisel;

Figure 2 is a side elevational view thereof, showing the chisel in operation;

Figure 3 is a sectional view taken substantially along a plane as indicated by the line 3—3 of Figure 2, and Figure 4 is end view looking toward the rear end of the chisel.

Referring more particularly to the drawing, the numeral 5 designates the improved chisel in its entirety. As illustrated in the drawing, the shank 6 of the chisel 5 is hexagon shaped in cross section although said shank may be of any other desired cross sectional shape.

As clearly illustrated in Figures 1 and 4, the chisel 5 is widened adjacent the forward end or head, designated generally 7, and the under side of the head is convex in cross section, as best seen in Figures 3 and 4, as indicated at 8.

The upper side of the head 7 is provided with an elongated, longitudinally disposed and slightly concave beveled surface 9 which is inclined toward and meets the convex under surface 8 at the relatively wide forward edge 10 of the chisel. The upper surface 9 is provided with a longitudinally disposed upstanding web 11 which extends from the rear or inner end thereof to a point some distance to the rear of the leading edge 10, as clearly illustrated in Figures 1 and 2. The web 11 is provided with a downwardly and forwardly inclined concave forward face 12 and has upwardly converging, corresponding side walls 13 which extend to the forward face 12 so that the side edges 14 of the face 12 converge toward their upper end. The upper surface of the web 11 is inclined slightly downwardly and forwardly from adjacent its rear end, at 15, to said forward end. The edges 14 are sharpened and form the cutting edges of the chisel 6, as will hereinafter become more fully apparent.

The web 11 divides the beveled face 9 into corresponding sections 16, which are inclined upwardly and rearwardly and which are slightly concave in cross section.

That portion of the forward end of the upper surface 9 which is located between the web face 12 and the leading edge 10 constitutes a guiding lip 17 which is relatively wide and which is adapted to engage between the work to be cut and the surrounding member, in advance of the cutting edges 14, for guiding the chisel 5 in its cutting operation as will hereinafter be described.

The chisel 5 is shown is Figures 2 and 3 in operation for removing a liner, bushing or sleeve 18 from a cylindrical member 19. To apply the tool 5, the leading edge 10 of the guide lip 17 is inserted between the internal wall of the member 19 and the exterior of the inner member 18 and advanced therein by impact against the opposite, rear end 20 of the shank 6. Any suitable means for driving the chisel, such as a hammer, sledge or pneumatic hammer may be utilized. The convex under side 8 will substantially conform to the internal contour of the member 19 and as the lip 17 is advanced between the members 18 and 19, the cutting edges 14 will engage and slice the inner member 18 along two substantially parallel longitudinal lines. Thus, as the chisel 5 is driven forwardly a ribbon 21 will be cut longitudinally through the member 18, thereby reducing its circumference. The adjacent edge portions 22 of the member 18 which are located on either side of the ribbon 21 will be curled upwardly and back, as illustrated in Figure 3, by engagement with the side walls 13 and the face portion 16. Thus, the chisel 5 may be advanced by impact longitudinally through the member 18 and 19 for cutting a longitudinal strip 21 therefrom, after which the member 18, having thus been reduced in circumference, may be readily removed from the member 19. If required to facilitate removal around other machinery parts, two such cutting operations may be performed on the member 18 so that the resulting segments may be separately removed with greater ease.

It will be readily apparent that the lip 17 will maintain the head 7 in proper engagement with the members 18 and 19 during the entire cutting operation so that it is unnecessary to manually hold or guide the chisel 5. The lip 17 will readily overcome any tendency of the cutting edges 14 to ride up and over the inner member 18 and thereby maintain the chisel 5 parallel to the axes of the members 18 and 19 to prevent marring of the bore of the cylindrical member 19. The widened head 7 will produce a spreading of the inner member 18 slightly in advance of the cutting edges 14 so that the tool 5 can be readily withdrawn, if necessary and reapplied with equal ease.

Various modifications and changes are contemplated and may obviously be resorted to without departing from the spirit and scope of the invention as hereinafter defined by the appended claims.

I claim as my invention:

1. A tool for removing liners, sleeves and bushings from cylinders, comprising an elongated impact actuated cutting tool having an underside which is straight longitudinally throughout its length and convex in cross-section, said tool having a wide forward end forming a head and defining a wide portion at the forward end of said underside, said head having a downwardly and forwardly inclined upper surface meeting the forward end of said underside to form a transversely disposed feather edge adapted to be inserted between a liner, sleeve or bushing and a surrounding cylinder, a longitudinally disposed web rising from said upper surface and extending to adjacent the forward, leading edge thereof and having a forwardly facing forward end spaced from said leading edge and forming a guide lip, said forward end of the web being inclined upwardly and rearwardly and the side edges thereof defining cutting edges adapted to execute shearing cuts through the liner, sleeve or bushing.

2. A tool as in claim 1, said forward end of the web being concave to define a guide surface adapted to engage a ribbon cut by said edges from the liner, sleeve or bushing and to cause said ribbon to be rolled inwardly of the liner, sleeve or bushing.

JAMES W. WILLIAMS.

REFERENCES CITED

The following references are of record in the file of this patent:

UNITED STATES PATENTS

| Number | Name | Date |
| --- | --- | --- |
| 1,598,458 | Sullivan | Aug. 31, 1926 |
| 2,203,158 | Klein | June 4, 1940 |
| 2,411,246 | Clapper | Nov. 19, 1946 |